United States Patent [19]
Woundy

[11] Patent Number: 6,023,464
[45] Date of Patent: Feb. 8, 2000

[54] AUTO-PROVISIONING OF USER EQUIPMENT

[75] Inventor: Richard Woundy, North Reading, Mass.

[73] Assignees: MediaOne Group, Inc., Englewood; U S West, Inc., Denver, both of Colo.

[21] Appl. No.: 08/996,350

[22] Filed: Dec. 23, 1997

[51] Int. Cl.$^7$ .................................................. H04L 12/66
[52] U.S. Cl. ........................................ 370/352; 375/222
[58] Field of Search .................................. 370/242, 252, 370/401, 402, 431, 437, 447, 453, 475, 352; 395/187.07, 188.01, 200.56, 200.68, 200.69, 500; 375/222; 709/227, 228, 229, 230, 217, 219; 713/201, 202

[56] References Cited

U.S. PATENT DOCUMENTS

| | | | |
|---|---|---|---|
| 5,708,654 | 1/1998 | Arndt et al. ............................ | 370/402 |
| 5,724,510 | 3/1998 | Arndt et al. ............................ | 370/401 |
| 5,790,548 | 8/1998 | Sistanizadeh et al. .................. | 370/401 |
| 5,812,819 | 9/1998 | Rodwin et al. ......................... | 395/500 |
| 5,835,723 | 11/1998 | Andrew et al. ...................... | 395/200.56 |
| 5,848,233 | 12/1998 | Radia et al. ....................... | 395/187.01 |
| 5,862,345 | 1/1999 | Okanoue et al. .................. | 395/200.68 |
| 5,872,524 | 2/1999 | Iida ....................................... | 370/440 |

*Primary Examiner*—Chau Nguyen
*Assistant Examiner*—Chiho Andrew Lee
*Attorney, Agent, or Firm*—Brooks & Kushman P C

[57] ABSTRACT

A system and method for provisioning a user terminal for accessing a wideband cable data distribution network, such as an Internet-over-cable system, utilizes an auto-provisioning web server to allow provisioning of a user cable modem without need for a field technician to separately input associated modem identification information via a telephone. A LDAP directory is used to store all provisioning information, and is accessible by a DHCP server to selectively allocate network IP addresses to only provisioned terminals.

11 Claims, 2 Drawing Sheets

AUTO-PROVISIONING OF USER EQUIPMENT

TECHNICAL FIELD

The present invention generally relates to data distributions networks using a wideband cable system, and more particularly to an improved method and system for provisioning user terminals, i.e., registering user terminals for authorized access to the network.

BACKGROUND ART

In the context of Internet over cable service, provisioning of subscriber equipment focuses on configuration of a dynamic host configuration protocol (DHCP) server and associated billing systems. A DHCP server operates to control use of network resources by assigning internet protocol (IP) addresses to provisioned user terminals. Examples of such user terminals include DHCP client-capable computers such as Pcs and Macs, and DHCP client-capable cable modems such as LanCity and MCNS-compliant modems.

A DHCP server requires a multiplexed analog composite (MAC) address of each user computer and associated terminal equipment. The configuration of the DHCP server indicates the DHCP fields and options to be returned to each user MAC address, dependent on the type of equipment (computer or modem) and on the user's level of authorized services. Currently, completion of the provisioning process requires field technicians to call data service representatives (DSRS) from a user's premise to report MAC addresses of the user's equipment.

In addition to being inefficient, manual provisioning of user terminals involves significant drawbacks. For example, such a provisioning process introduces a substantial potential for human error, requires a large number of support personnel, and impedes or complicates future changes in user equipment. Thus, a need exists for an improved provisioning system and method which does not require service technicians to input critical information via telephone calls.

DISCLOSURE OF THE INVENTION

Therefore, it is an object of the present invention to provide a system and method for auto-provisioning of user terminals in a wideband cable data distribution network.

It is another object of the present invention to provide a system and method for auto-provisioning of user terminals in a wideband cable data distribution network which minimizes potential opportunities to breach system security.

In accordance with these and other objects, the present invention provides a method and system for auto-provisioning of user equipment in a wideband cable data distribution network comprising server-assisted provisioning of user computers and cable modems, using only data transmitted over the cable service from a user location to enable registered access to network services.

Auto-provisioning reduces the potential for human-introduced error, provides better scaling of equipment provisioning, easily accommodates modification of equipment provisioning by users, and increases future installation options. By eliminating the requirement for field technician telephone calls, the present invention avoids the possibility of information corruption through input error, and reduces the number of support employees required for each installation.

In addition, the present invention provides a user with the capability of utilizing the provisioning system and method without aid of a field technician. This in turn simplifies modifications to service access due to interchanging of computers or Ethernet interfaces, and also allows a user to provision and install their own service.

The present invention utilizes four subsystem operations which include: (1) an "inventory pre-provisioning system" for inputting cable modem serial numbers and MAC addresses into a billing system and into a network user database such as a lightweight directory access protocol (LDAP) directory; (2) a DHCP server functioning to automatically allocate and assign IP addresses to user terminals; (3) an LDAP directory server to manage a plurality of directory subtrees used to provide provisioning of equipment; and (4) an auto-provisioning web server.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
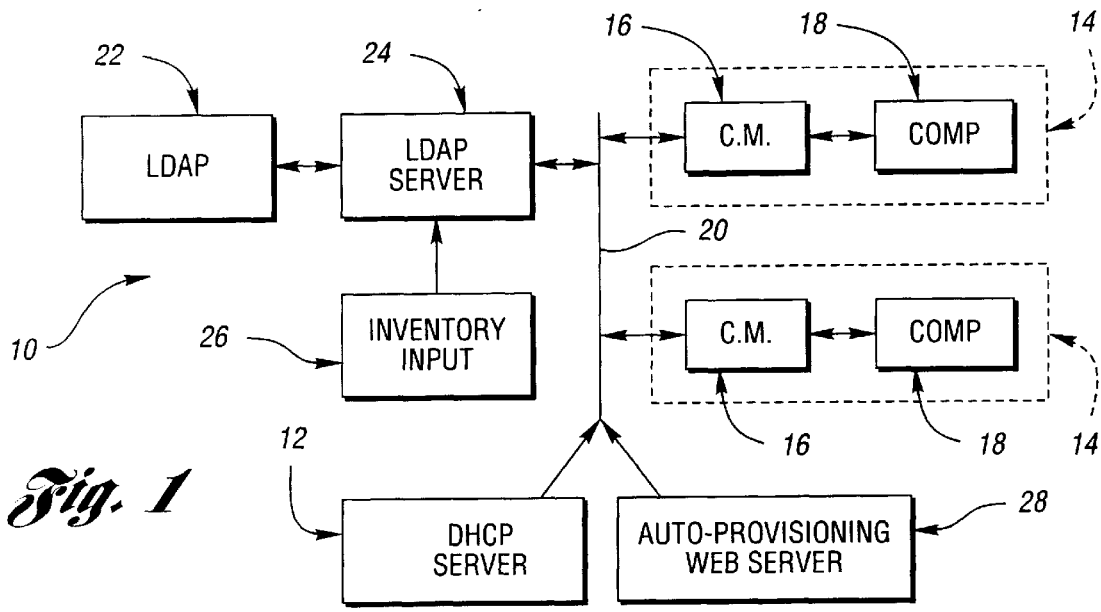
FIG. 1 is a block diagram of a wideband cable data distribution system in accordance with the present invention.

Referring to FIG. 1, a wideband cable data distribution system 10 in accordance with the present invention is shown having at least one DHCP server 12 functioning to automatically allocate and assign IP addresses to a plurality of user terminals 14 having a computer 16 connected to server via a cable modem 18 and a coaxial cable 20.

A lightweight directory access protocol (LDAP) directory 22 is connected to the DHCP server and functions as a network user information and access privilege database. An LDAP directory server 24 manages a plurality of directory subtrees used to perform auto-provisioning as described below.

A pre-provisioning inventory input system 26 is connected to the system for storing cable modem serial numbers and MAC addresses into the LDAP 22. An auto-provisioning web server 28 is also provided to allow non-provisioned and nonregistered users limited network access for the purpose of provisioning or registering a user cable modem or computer.

Figure 2:
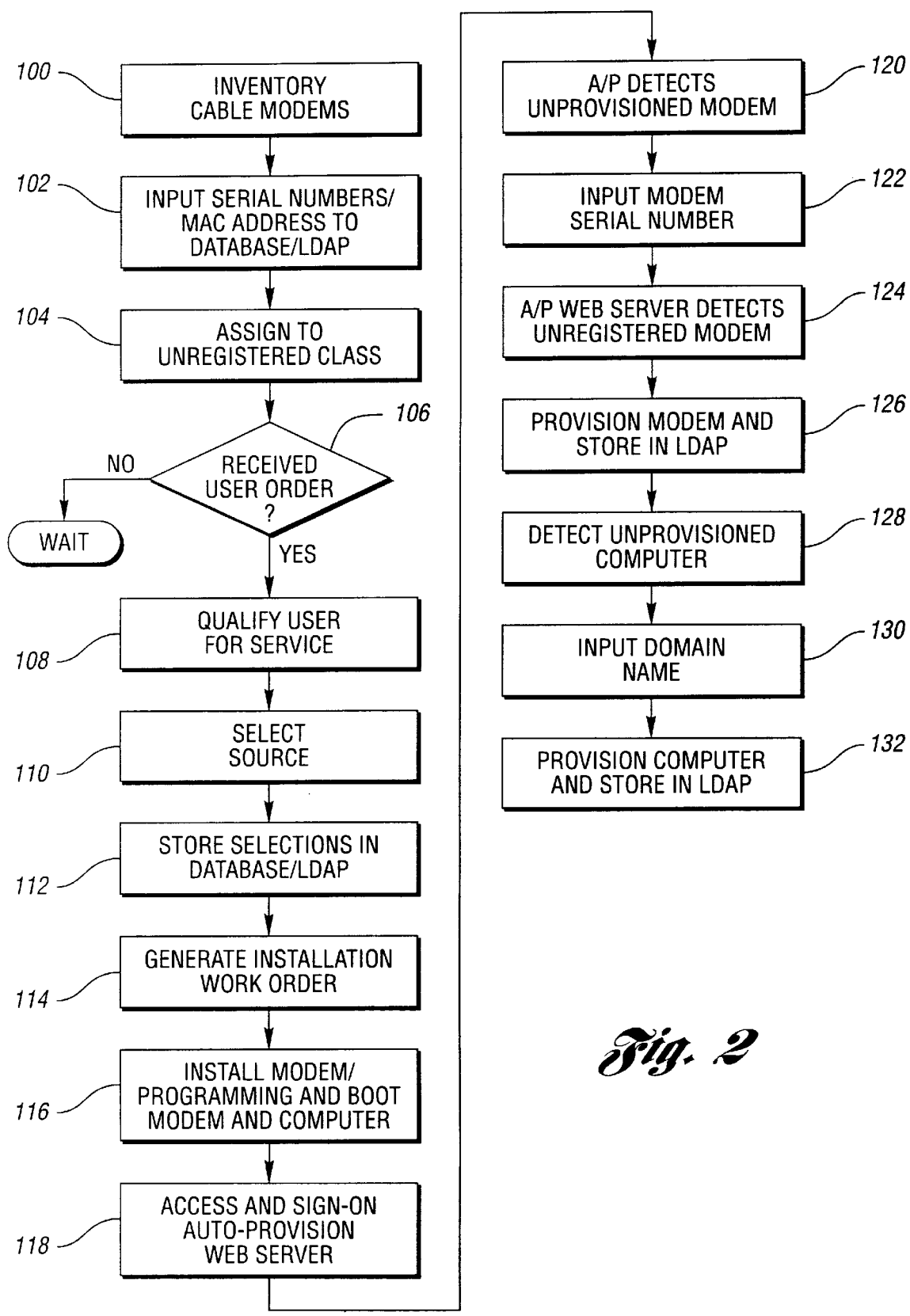
FIG. 2 is a flowchart illustrating the auto-provisioning operation in accordance with the present invention.

Description of the auto-provisioning operation of the present invention will be made in connection with the flowchart shown in FIG. 2. As shown at a block 100, individual cable modems or other terminal equipment are added to a system's inventory stock database by delivering the modems to an appropriate warehouse location for storage therein. At block 102, each cable modem serial number and/or MAC address is input into the inventory database, and logged into the appropriate billing system and LDAP directory via the inventory pre-provisioning system 26. At block 104, after logging into the directory, the DHCP will assign each new cable modem to an "unregistered cable modem" service class having limited network access privileges, and is not associated with any particular user.

As shown at block 106, if a DSR (Data Services Representative) receives a user call to order a new service, the DSR determines at block 108 whether the user is qualified to receive the requested service. The DSR utilizes both financial and technological considerations in qualifying a particular user. Information regarding the user computer equipment is also obtained at this step.

At block 110, the DSR guides the user through the selection of services such as e-mail addresses, domain names, dial-up options, access options, etc. Such information is used to tailor the provisioning process.

At block 112, the DSR uses the provisioning system to transmit the new user information into the relevant billing system and into the LDAP directory. As noted above, each new user computer is assigned by the DHCP server to an "unregistered computer" service class having limited access privileges. In particular, access is preferably restricted to the auto-provisioning web server 28. Provisioning system 28 then triggers a work order at block 114 to schedule cable modem installation at the user location.

As part of the installation process, at block 116 a field technician physically connects a cable modem including appropriate programming for the ordered service, then "boots" the user cable modem. Since the cable modem belongs to an "unregistered cable modem" service class, the cable modem "boots" via DHCP with limited access privileges for attached user computers. The service programming is then installed and the user computer booted. Since the computer belongs to the "unregistered computer" service class, the computer boots via DHCP with access limited to the auto-provisioning web server.

At block 118, the user computer is used to access the auto-provisioning web server/page, and the information obtained during service selection step 110, i.e., user name, location, and password, are used to sign-on to the auto-provisioning web page.

After signing on, the auto-provisioning web server will query the DHCP server directory for user authentication, and will detect the lack of a provisioned cable modem for the user at block 120. The field technician will input the cable modem serial number to the auto-provisioning web server at block 122. The auto-provisioning web server then queries the DHCP server directory for verification of the cable modem serial number, and at block 124, if the number corresponds to an "unregistered cable modem", provisioning of the cable modem will be completed at block 126. The DHCP server stores in the LDAP the association between the cable modem and the new service user information. This association modifies the DHCP service class and consequently the cable modem access options. The server then resets the cable modem (via a simple network management protocol (SNMP)) so that the new cable modem access options are used.

In further accordance with the present invention, the auto-provisioning web server detects at block 128 that a user computer is not provisioned by examining the source IP address of HTTP traffic from the user computer and using DHCP server queries. The field technician selects the user domain name to be associated with the user computer at block 130, and the auto-provisioning web server completes provisioning of the user computer at block 132. The server creates an DHCP directory entry for the user computer, and sets up the LDAP directory association between the computer and the new service user information. The computer is then identified by the proper domain name, and the associated DHCP server service class is updated.

In the preferred embodiment, an "unregistered computer" service class has a limited authorized access period of time. Thus, the new computer DHCP access options are quickly enabled. The web server may also reset the cable modem to process the IP address change of the user computer. After user equipment provisioning is complete, the field technician verifies Internet access capabilities and updates the work order.

Figure 3:
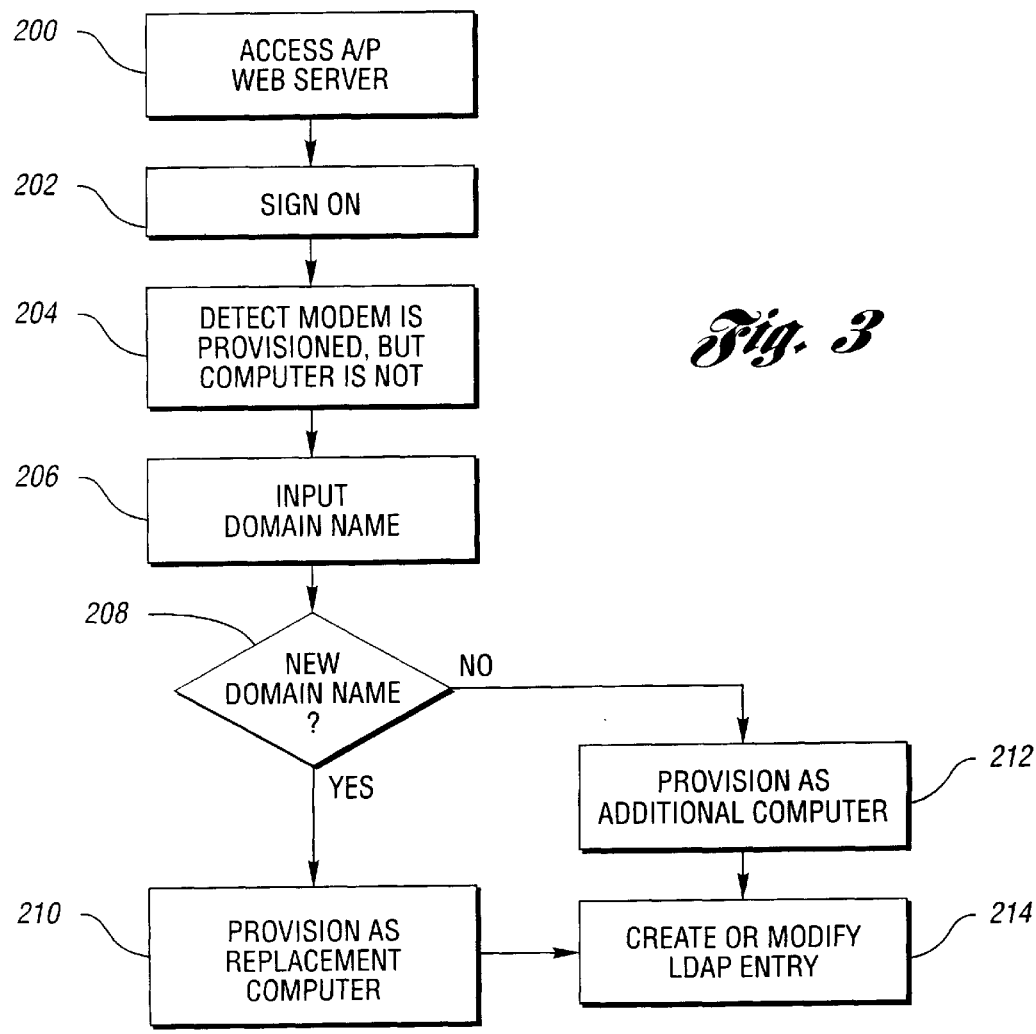
FIG. 3 is a flowchart illustrating a process for adding or replacing a provisioned computer in accordance with the present invention.

Referring to the flowchart in FIG. 3, if a user wanted to add or replace a provisioned computer at the user's location, the user accesses the auto-provisioning web server/page at block 200, such as by using the new computer and an Ethernet type connection. A web browser can provide access to the auto-provisioning web server. The user inputs user information such as name, location, and password, to sign-on to the auto-provisioning web page at block 202.

The auto-provisioning web server queries the LDAP directory for user authentication, and at block 204 will detect that the user cable modem is provisioned, but that the user computer is not provisioned. This is detected by examining the source IP address of HTTP traffic from the user computer and using LDAP queries.

At block 206, the user selects and inputs the user domain name to be associated with the user computer. At block 208, if the domain name currently belongs to another user computer, then the new computer is provisioned and logged as a replacement at block 210. Otherwise, the new computer is provisioned and logged as additional user equipment at block 212.

The auto-provisioning web server then completes provisioning of the user computer. At block 214, the server creates and/or modifies an LDAP directory entry for the user computer, and sets up the LDAP direction association between the computer and the service user information. The computer is identified by the proper domain name, and the associated DHCP server service class is updated. As noted above, because an "unregistered computer" service class has a limited authorized access period of time, the new computer DHCP access options are quickly enabled. The web server may also reset the cable modem to process the IP address change of the user computer.

In further accordance with the present invention, if a user cable modem boots onto the system without first having been "inventory pre-provisioned" and logged in the service class "unregistered cable modem," the DHCP server will not respond.

As noted above, in the inventory pre-provisioning process, the inventory programming is arranged to create an LDAP directory entry for each cable modem with service class "unregistered cable modem". The DHCP server options and configuration file are set to provide limited access service for auto-provisioning but not full network or Internet access.

If the user cable modem boots onto the system after being properly "inventory pre-provisioned" in the service class "unregistered cable modem," then the DHCP server and user terminal can begin the process of being allocated an IP address to permit access to the network. The IP address range of user computers in the "unregistered computer" service class is preferably within a private address space such as 10.x.x.x. If the user computer boots on the cable plant without first being auto-provisioned, the DHCP server creates an explicit LDAP directory entry for service class "unregistered computer" when the server assigns the computer an IP address. This allows the computer to boot with limited access for auto-provisioning.

If a user computer is replaced by another user computer using the auto-provisioning web server as described in connection with FIG. 3, then the web server is arranged to copy the assigned IP address from the old LDAP directory entry to the new entry, and delete the old entry. This arrangement minimizes domain name changes for DNS.

While the best mode for carrying out the invention has been described in detail, those familiar with the art to which this invention relates will recognize various alternative designs and embodiments for practicing the invention as defined by the following claims.

What is claimed is:

1. A method for provisioning a user terminal to allow access to a wideband cable data distribution network comprising:

pre-provisioning a cable modem by inputting into a network database information identifying the cable modem to be connected to the user terminal;

establishing limited network access right for the pre-provisioned cable modem that allows access only to an auto-provisioning web server;

accessing the auto-provisioning web server using the terminal equipment and cable modem;

detecting that the terminal equipment is not provisioned;

prompting for input of the modem identification information;

verifying input information with identification information stored in said database; and provisioning the modem by storing in said database user identification information to be associated with the modem identification information.

2. The method of claim 1 wherein the inputting of the modem identification information into the database further comprises assigning the modem to an unregistered class of modems.

3. The method of claim 1 wherein the user terminal comprises a computer, and said method further comprises:

detecting whether the computer has been provisioned;

if not, then prompting for input of a domain name; and provisioning the computer by storing the inputted domain name in said database in association with the modem identification information.

4. The method of claim 3 further comprising determining that the modem was previously provisioned and the inputted domain name is already stored in the database in association with a different computer, and provisioning the computer as a replacement computer.

5. The method of claim 3 further comprising determining that the modem was previously provisioned and the inputted domain is not stored in the database, and provisioning the computer as an additional computer.

6. A system for provisioning a user terminal to allow access to a wideband cable data distribution network comprising:

a DHCP server connected to said cable network for controlling access to the network by selectively allocating network IP addresses to provisioned user terminals;

a cable modem connected to the user terminal and the cable network, said cable modem having unique identification information;

a modem identification input subsystem for pre-provisioning the cable modem by inputting the unique modem identification information into a network database; and an auto-provisioning web server connected to the network and arranged to prompt a user for input of the cable modem identification information, verify whether the modem is provisioned, and provision modem by storing in the database user identification information to be associated with the modem identification information, wherein the DHCP server is arranged to assign limited network access rights to pre-provisioned modems allowing access to only the auto-provisioning web server.

7. The system of claim 6 wherein said database comprises an LDAP directory.

8. The system of claim 6 wherein said modem identification input subsystem assigns each unprovisioned cable modem to an unregistered class.

9. The system of claim 6 wherein the user terminal comprises a computer, and said auto-provisioning web server is further arranged to detect whether the computer has been provisioned, if not, then prompting for input of a domain name, and provision the computer by storing the inputted domain name in the database in association with the modem identification information.

10. A system for provisioning a user terminal to allow access to a wideband cable data distribution network comprising:

an inventory pre-provisioning system for inputting cable modem serial numbers and MAC addresses into a billing system and into a network user database;

a DHCP server arranged to automatically allocate and assign IP addresses to user terminals;

an lightweight directory access protocol (LDAP) directory server arranged to manage a plurality of directory subtrees used to provide provisioning of equipment; and an auto-provisioning web server arranged to prompt a user for input of the cable modem identification information when a user needs to be provisioned, and provision the modem by storing in the database user identification information to be associated with the modem identification information, wherein the DHCP server is arranged to assign limited network access rights to pre-provisioned modems allowing access to only the auto-provisioning web server until the modem is provisioned.

11. The system of claim 10 wherein the database comprises a lightweight directory access protocol (LDAP) directory.

* * * * *